W. R. WOODWARD & F. E. CROMPTON.
MACHINE FOR SIMULTANEOUSLY WRITING A PLURALITY OF SIGNATURES OR INSCRIPTIONS.
APPLICATION FILED DEC. 9, 1910.

1,008,099.

Patented Nov. 7, 1911.

W. R. WOODWARD & F. E. CROMPTON.
MACHINE FOR SIMULTANEOUSLY WRITING A PLURALITY OF SIGNATURES OR INSCRIPTIONS.
APPLICATION FILED DEC. 9, 1910.

1,008,099.

Patented Nov. 7, 1911.

Witnesses:
Ray O. Ornst.
Emanuel M. Fenster.

William R. Woodward
and Frank E. Crompton
Inventors.

By their Attorneys Knight Bros.

COLUMBIA PLANOGRAPH CO., WASHINGTON, D. C.

W. R. WOODWARD & F. E. CROMPTON.
MACHINE FOR SIMULTANEOUSLY WRITING A PLURALITY OF SIGNATURES OR INSCRIPTIONS.
APPLICATION FILED DEC. 9, 1910.

1,008,099.

Patented Nov. 7, 1911.

UNITED STATES PATENT OFFICE.

WILLIAM R. WOODWARD AND FRANK E. CROMPTON, OF NEW YORK, N. Y., ASSIGNORS TO THE SIGNATURE COMPANY, OF NEW YORK, N. Y., A CORPORATION OF NEW YORK.

MACHINE FOR SIMULTANEOUSLY WRITING A PLURALITY OF SIGNATURES OR INSCRIPTIONS.

1,008,099.            Specification of Letters Patent.       Patented Nov. 7, 1911.

Application filed December 9, 1910. Serial No. 596,435.

*To all whom it may concern:*

Be it known that we, WILLIAM R. WOODWARD and FRANK E. CROMPTON, citizens of the United States, and residing in the borough of Brooklyn, city, county, and State of New York, have invented certain new and useful Improvements in Machines for Simultaneously Writing a Plurality of Signatures or Inscriptions, of which the following is a specification.

The present invention relates to improvements in the type of machines designed to produce a plurality of original signatures or inscriptions upon checks, stocks, bonds or other instruments by a single operation of the individual signing the instruments, such as shown in prior Patents No. 870,333, dated November 5, 1907, No. 880,950, dated March 3, 1908, and No. 919,689, dated April 27, 1909. Machines of this class embody a suitable frame supporting a bed plate or table upon which checks or other documents are arranged in writing position, and a carriage supporting a plurality of pens and connected with the frame by pantographic links, and provided with a monitor handle by which the pen carriage is moved and the position of the pens is controlled.

The present invention relates first to improved means for controlling the pens upon the pen carriage, second to improved means for moving the documents into and out of writing position, third to means for holding the documents against displacement while they are being inscribed, and fourth, to means for supporting the inscribed documents while the ink dries upon them.

In order that the invention may be fully understood it will first be described with reference to the accompanying drawings and the novelty afterward more particularly pointed out in the annexed claims.

In said drawings.

The machine frame comprises two upright standards or side frames 1 and 2 braced near the bottom by a tie bolt 3 and supporting at the top the main bed or table 5 upon which the documents to be signed are passed into and out of writing position and upon which they are supported while being inscribed. This bed or table 5 has an extension leaf 6 connected to the main bed or table by hinges indicated in dotted lines at 7.

Figure 4:
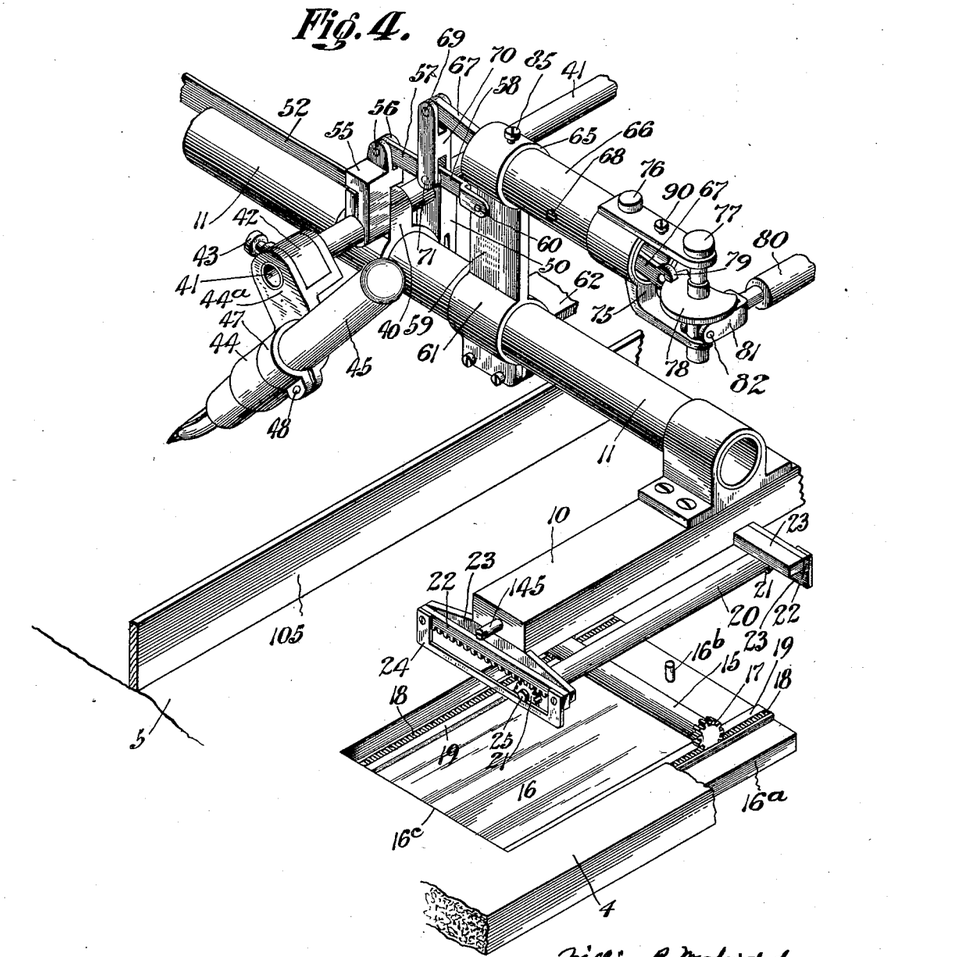
Fig. 4 is a detail perspective view of part of the pen carriage and one of its anti-friction supports, showing one of the pens and the means for controlling its operation.
Figure 5:
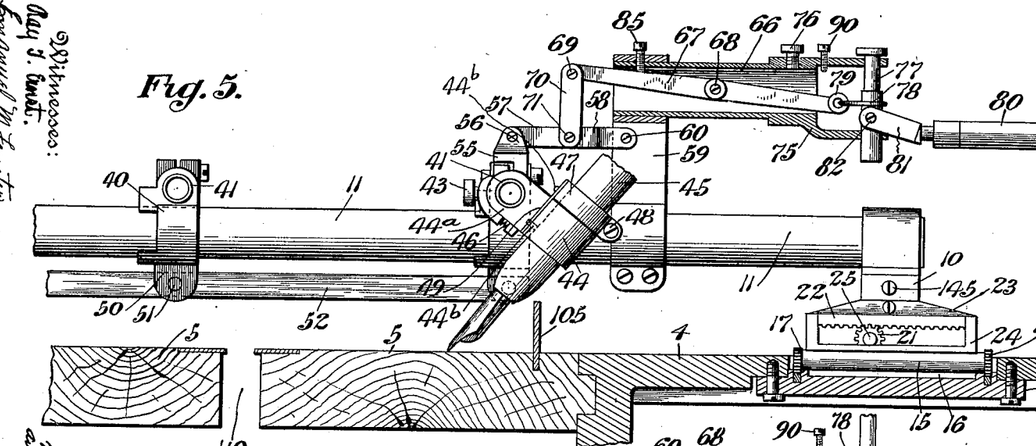
Fig. 5 is a detail transverse sectional view of the same mechanism, showing the pen in writing position.
Figure 6:
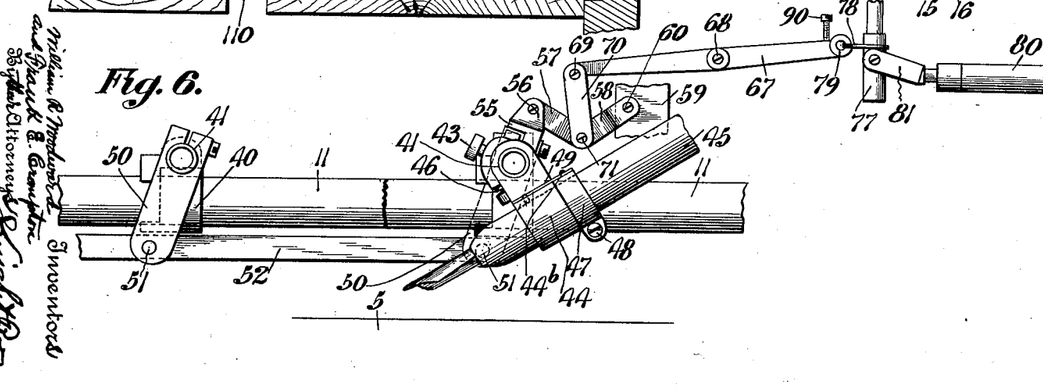
Fig. 6 is a similar view showing the pen elevated away from the bed or table.
Figure 7:
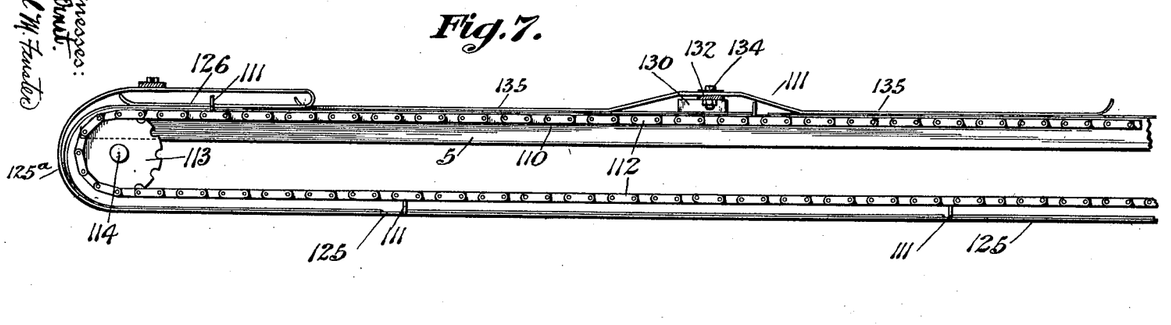
Fig. 7 is a detail longitudinal sectional view illustrating the means for moving and controlling the documents.
Figure 8:
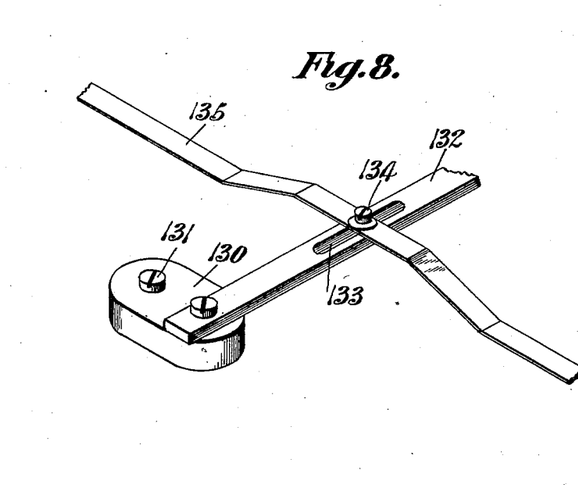
Fig. 8 is a detail perspective view showing one of the spring strips for holding the documents in writing position.

The pen carriage, which is supported upon the bed 5 and movable in all directions thereover, comprises the side frames 10 and the parallel tubular bars 11 extending between and rigidly connected with the side frames 10. The pen carriage is supported at each of its four corners by anti-friction bearings, preferably in the form of rolls, as shown particularly in Fig. 4 of the drawings. The horizontal side plates 4 at the top of standards 1 and 2 are formed with openings 16 cut through them. The ends of these openings are closed at the bottom by the removable plates $16^a$ secured in place by screws $16^d$. Mounted upon plates $16^a$ are the parallel rack bars 18 and track bars 19, and operating in openings 16 above plates $16^a$ are the bearing rolls 15 which run upon tracks 19 and are provided with pinions 17 which mesh with the racks 18, the depth of the teeth of pinions 17 and rack bars 18 being properly proportioned to permit the rolls 15 to rest upon said tracks 19. This mounting of the anti-friction rolls 15 insures their parallel movement in the ends of openings 16 and prevents them from sliding upon their supports. The pins $16^b$ seated in the plates $16^a$ and the end walls $16^c$ of the openings 16 limit the travel of the rolls 15 longitudinally of the machine.

Coöperating with the anti-friction bed rolls 15 are similar carriage rolls 20 supported in suitable bearings extending beneath the side frames 10 of the pen carriage. The rolls 20 extend at right angles to the rolls 15 and have secured to opposite ends pinions 21 which mesh with the rack bars 22. The surfaces of the rolls 20 bear upon track bars 23 arranged alongside of and parallel with the rack bars 22, the teeth of pinions 21 and racks 22 being of the proper depth to permit the rolls 20 to travel upon the track bars 23. Yokes 24 engage the axial lugs 25 of the rolls 20 for confining the rolls in their bearings. Each rack bar 22 and yoke 24 is secured to a track bar 23 which is fastened to the under surface of side frame 10 adjacent to one end.

It will be observed that the pen carriage having the anti-friction rolls supporting its four corners is capable of free movement in every direction, the bed rolls 15 moving freely for any movements of the carriage parallel with the length of the bed 5, while the carriage rolls 20 move freely for any movement of the carriage transversely of the bed 5.

To confine the movements of the pen carriage to movements of translation only and to properly limit its movements to the requirements of the machine, the carriage is connected with the bed frame by suitable pantographic links and confined by suitable stops. As shown the central transverse bar 11 is provided at its opposite ends with depending posts extending through openings 16 and limiting the movements of the carriage transversely of the machine by engaging the side walls of said openings. Two pantographic links 30 and 31 are pivoted to each post 11$^a$ and pivotally connected with similar links 32 and 33 pivoted to the table upon studs 34 and 35. The two pairs of links 30, 32 are connected by a bar 36 and the two pairs of links 31, 33 are connected by a bar 37. Adjustable stop screws 145 project axially from the ends of side frames 10 in position to engage the end walls of boxing 95 to limit the movements of the carriage longitudinally of the machine. In this manner the pen carriage is properly confined in its movements, so that every part of the carriage will move in exactly the same direction under the control of the monitor device presently to be described.

Adjustably mounted upon the transverse bars 11 of the pen carriage are a number of journal brackets 40 in which are journaled the rock shafts 41 and upon which the pens or writing members are mounted. Secured to these rock shafts 41 are the adjustable collars 42 secured in place by set screws 43. The pens or writing members 45 are removably mounted in the swinging sockets 44 formed with upwardly presented yokes 44$^a$ which embrace adjustable collars 42 upon the rock shafts 41. Small springs 46 are interposed between the yokes 44$^a$ and collars 42 for the purpose of giving a yielding engagement between these parts to enable the writing members to travel over slight inequalities without affecting its operation. The writing members are preferably in the form of fountain pens. Each pen is provided with a split band 47 secured upon the pen by screw 48 and provided with a small pin 44$^b$ engaged by a leaf spring 49 which projects over it from the pen socket 44 for holding the pen in position in its socket. It will be clear that by adjusting the band 47 upon the pen the operative position of the pen in its socket can be changed to suit varying requirements. When the pens have once been adjusted to operate properly in the machine, the adjustment can be maintained by the bands 47 and springs 49. This enables the operator to remove the pens for filling and replacing them in proper adjusted position without loss of time. Each pen supporting rock shaft 41 is provided with an adjustable dependent rock arm 50 and said rock arms 50 are all pivotally connected at their lower ends 51 with a link 52 which insures the simultaneous movement of all of the rock shafts 41.

The rock shaft 41 nearest one side of the machine is provided with an adjustable rock arm 55 projecting upwardly from it and formed in its upper end with the ears or lugs 56 between which is pivoted one of a pair of toggle links 57, 58. These toggle links 57, 58 are pivotally connected and the link 58 has a yoke-shaped end which straddles an upright post 59 and is pivotally connected thereto at 60. The post 59 is formed integral with a socket 61 which embraces and is secured to one of the transverse bars 11 of the pen carriage. To properly brace the post 59 I provide a lateral bracing arm or plate 62 extending to one side from the socket 61 and formed at its end with a socket 63 which embraces the adjacent transverse bar 11 of the pen carriage. The upper end of the post 59 is formed with an integral socket 65 in which is mounted a forwardly projecting tube 66. A controlling lever 67 extends through the tube 66 and is centrally pivoted therein upon the pivot screw 68. The inner end of the controlling lever 67 is pivoted at 69 to a link 70 which is pivotally connected with the toggle links 57 and 58 at 71. A head or yoke 75 is secured to the end of tube 66 by means of a screw 76 and a controlling pin 77 is mounted in the two arms of the yoke 75, so as to move freely vertically therein. This controlling pin 77 has secured to it a horizontal plate 78 which engages the bifurcated end 79 of the controlling lever 67, so that the movements of pin 77 in its bearings will rock the controlling lever and parts connected therewith.

80 is the monitor handle provided at its end with a yoke 81 which straddles the controlling pin 77 and is pivotally connected thereto at 82. By reason of the connection of the monitor handle 80 with controlling pin 77 and the mounting of said pen in the yoke 75, the monitor handle will have perfect freedom of movement in any direction, so that the operator can hold it in the position which is most natural and convenient for him in writing. It will be observed that by a slight downward pressure on the monitor handle 80, the lever 67 will be rocked to pull upwardly upon the toggle links 57, 58 which will cause the rocking of the connected pen supporting rock shafts 41 in the direction to throw the pens into writing position. These toggle links 57, 58 are so arranged that they can move into alinement to automatically lock the pens in writing position, so that the operator can be relieved of the necessity for maintaining any downward pressure upon the monitor handle. This is an important feature of the present invention. Some operators prefer the machine without this toggle locking feature, and to avoid the operation of the toggle lock when it is not desired, I provide a limiting screw 85 extending through the wall of the socket 65 and tube 66 into the path of the rear arm of the controlling lever 67. By adjusting this screw inwardly it will be observed that the upward movement of lever 67 can be so limited that the toggle links 57 and 58 will not be able to move up into alined locking position. When the machine is adjusted to operate without the toggle locking feature it will, of course, be understood that the connection between the rock arm 55 and its supporting rock shaft 41 can be adjusted to suit this changed condition of the machine, if necessary, although the adjustment of the controlling lever 67 for effecting this change is so slight that further adjustments of other parts are usually unnecessary.

In the operation of the machine it is desirable to limit the upward movement of the pens away from the documents upon the bed plate as much as can be without interfering with the movement of the documents beneath the pens. The required elevation of the pen above the documents differs with the class of work, it being clear that in signing single sheet documents, such as a series of checks printed in sheet form, there is very slight elevation of the pens necessary to permit the free movement of the single sheets beneath them, but that on the other hand when a series of overlapping documents such as stocks and bonds are being operated upon, there is considerable more bulk of paper passing beneath the pens and they must therefore be raised to a slightly higher elevation above the documents to insure freedom of movement of the documents beneath them. To readily adjust the limit of the movement of the pens away from the documents, I provide adjusting screw 90 threaded through the upper arm of the yoke 75, so as to project into the path of the outer arm of the controlling lever 67. This screw 90 limits the upward movement of the outer end of controlling lever 67 and thereby limits the extent of elevation of the pens away from the documents. By adjusting screw 90 inwardly the pens can be arrested closer to the documents being inscribed.

The ends of the pen carriage, the anti-friction supports and the pantographic links connecting the carriage with the bed frame of the machine are inclosed by suitable boxing, indicated at 95, having removable top plates 96 to facilitate access to the parts mentioned.

Figure 1:
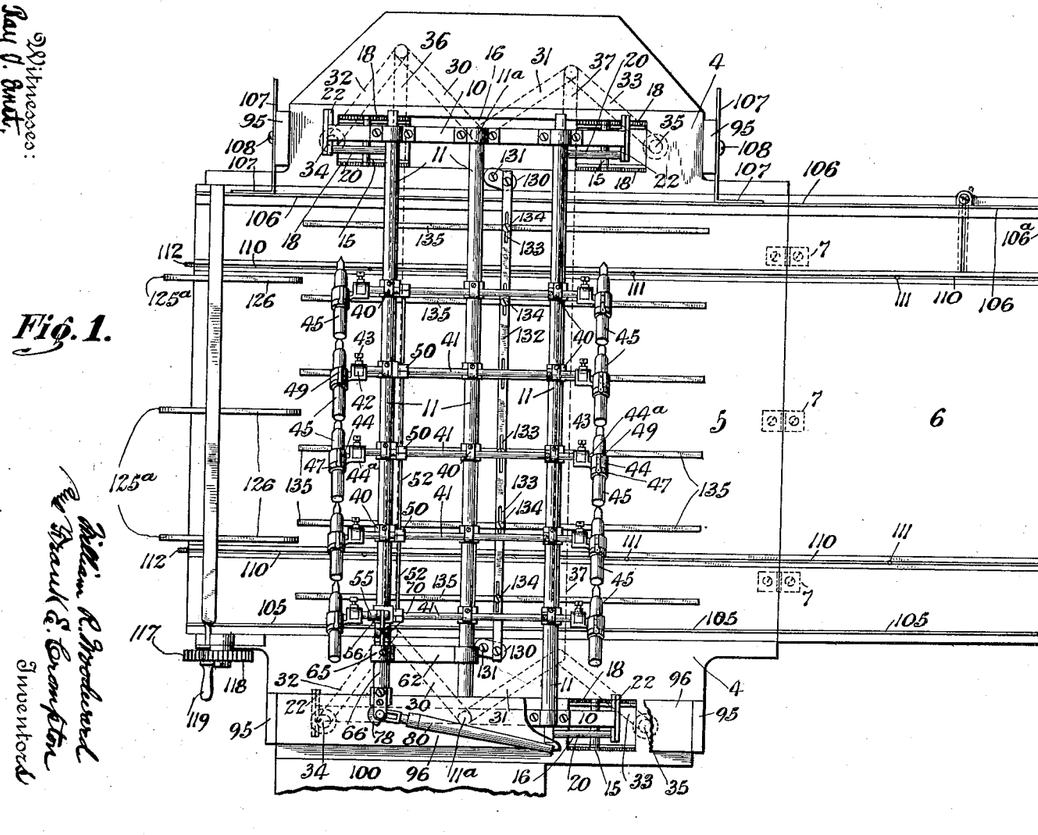
Figure 1 is a plan view of the improved machine.
Figure 2:
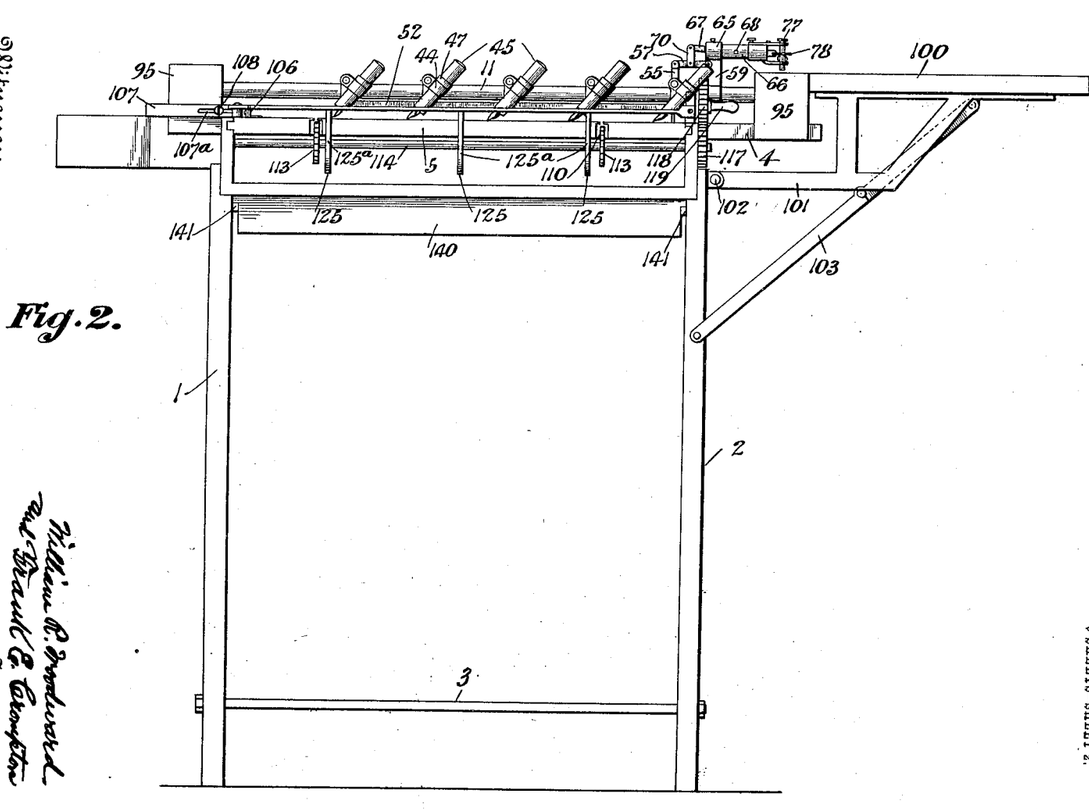
Fig. 2 is an end elevation of the same.
Figure 3:
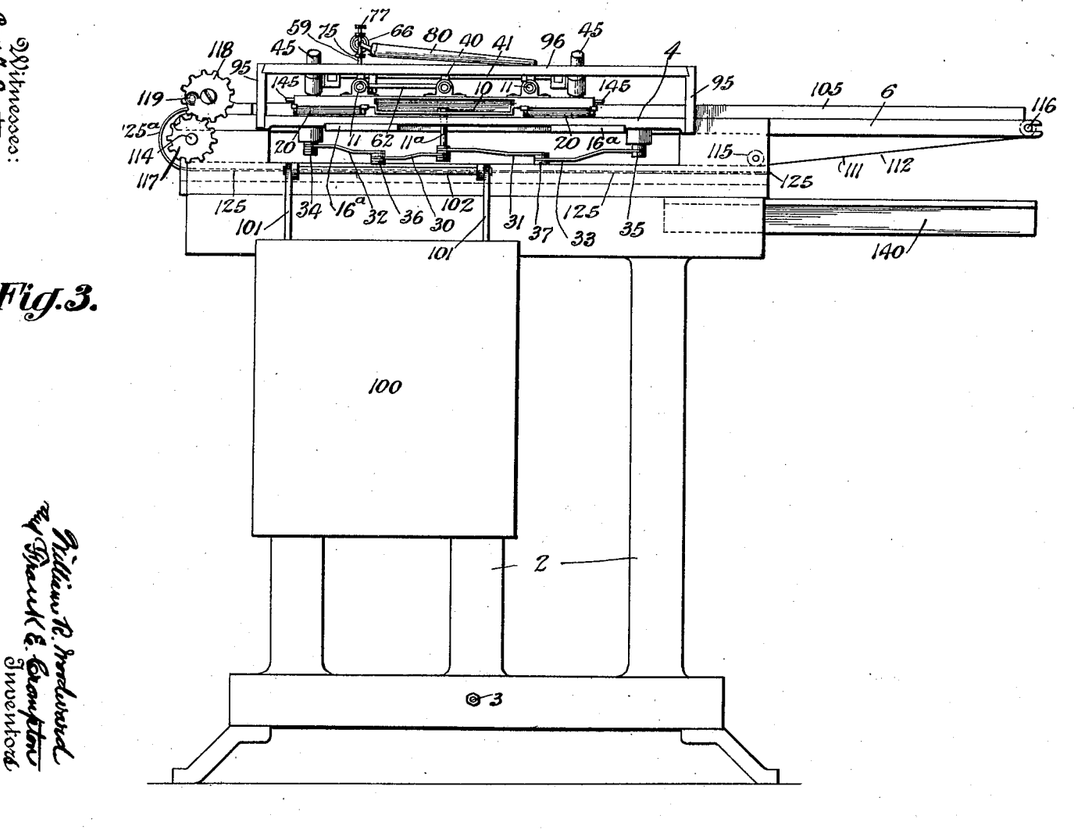
Fig. 3 is a side elevation of the same.

An extension shelf or table 100 is mounted upon bracket arms 101 pivoted to one of the side frames 2 at 102, so as to be supported when elevated in the same horizontal plane as top plate 96 of the boxing at one side of the machine. This shelf or table 100 is held in operating position by the hinged links 103 connecting it with the side frame of the machine, so that it can be supported in operative position as shown in Fig. 2, and let down against the side of the machine to take up less space when not in use, as shown in Fig. 3 of the drawings. The monitor controlling device is presented above the plate 96 and the shelf or table 100 in convenient position for operation as shown in Figs. 1 and 2 of the drawings.

105 is a vertical guide plate set into the upper surface of the bed or table 5 adjacent to one side thereof, so as to guide the checks or other documents over the table as they are fed into writing position. 106 is a second guide plate mounted upon bracket arms 107 adjustably secured to the end walls of boxing 95, by means of set screws 108 passing through slots 107$^a$ of the brackets. The guide plate 106 is supported in the manner described parallel with the fixed guide plate 105 and may be adjusted toward and away from said fixed plate. The guide plates 105 and 106 are broken on the line of separation between table 5 and extension 6, and the portion of guide plate 106 on extension 6 is adjustably secured to extension 6 by any suitable means such as shown. The sectional guide plate 106 is preferably formed of angle-metal with a horizontal flange resting upon the table to prevent sheets getting under the guide plate. At the receiving end of the machine upon the hinged extension 6 of the bed 5 the adjustable guide plate 106 is formed with an inwardly presented angular extension 106$^a$ to assist the attendant in placing documents in the machine in the manner hereinafter explained. The bed or table 5 and extension 6 are formed from end to end with slots 110 in which travel sheet engaging fingers 111 mounted upon endless feed chains 112 which pass over the sprocket wheels 113 keyed to shaft 114, journaled in suitable bearings at one end of the machine, and idler rolls or pulleys 115 and 116, the latter of which are journaled in the supports for the extension table 6. The shaft 114 carries at one end a gear wheel 117 meshing with a similar gear wheel 118 journaled upon the machine frame above it and provided with a crank handle 119 by which it is rotated. Supported beneath and parallel with the bed or table 5 are the sheet supporting strips or bars 125 on to which the checks or other documents are delivered in inverted order after they have been inscribed. These strips or bars 125 are curved up and around the sprocket wheels 113 and the end of bed or table 5 to form guides 125ª to lead the sheets or documents from the bed 5 around the sprocket wheels 113 on to the strips or bars 125 when the sheets or documents are fed from the bed by the action of the conveyer chains.

126 are spring fingers extending parallel with the bed 5 and forming extensions of the curved strips 125ª for confining the sheets or documents as they pass from the bed 5 into the curved throat formed between the curved sections of guiding strips 125ª and the sprocket wheels and chains.

Mounted upon the bed 5 at each side of the machine is an adjustable link 130 pivotally mounted upon the screw 131 seated in the extension of the bed. Extending between and pivotally connected with the ends of the links 130 is a rod or bar 132 formed with a series of longitudinally extending slots 133. This bar 132, which extends from side to side of the bed of the machine, supports a series of sheet engaging strips or fingers 135 which are preferably formed of light spring metal and so shaped as to engage the sheets or documents upon the bed on opposite sides of the zones of writing. These spring strips or fingers are independently adjusted upon other supporting bar 132 by means of bolts 134 passing through the strips or fingers and the slots 133. A series of sheet engaging strips 135 can be adjusted as a whole transversely of the machine by shifting the supporting links 130 upon their securing screws 131, said links 130 moving as parallel links toward either side of the machine and accomplishing this adjustment. It is necessary to adjust the strips 135 laterally of the bed to suit the locations of the lines for signatures or inscriptions upon the documents which are to be inscribed. This adjustment is required to suit the adjustment of the pens, so that the sheet holding strips will not interfere with the operation of the pens in the desired adjusted positions.

Any suitable receptacle may be provided to receive the signed checks or documents from the supporting strips or bars 125. As a convenient arrangement I have shown a tray or drawer 140 mounted between the side frames or standards 1 and 2 beneath the strips 125. This tray or drawer 140 is slidably mounted on rails 141, so that it can be pushed in out of the way when the machine is not in use or be pulled out into operative position to receive successive checks or documents from the strips or bars 125.

In the operation of the improved writing machine it will be understood that an attendant supplies duplicate sheets or sets of checks or other documents upon the extension 6 of the bed in position to be engaged by two successive pairs of sheet engaging lugs or fingers 111. The person signing the checks or other documents causes the conveying chains to advance the sheets or documents by rotating the handle 119, the advancing movement being continued until the two series or sets of checks or documents are brought into writing position beneath the two series of pens. When in writing position the advancing movement of the chains is discontinued and the documents signed by the operation of the monitor handle, the same being used as an ordinary pen. The documents are held firmly in place upon the bed by the engagement of the spring strips 135. The operator grasps the monitor handle 80 and by a slight downward pressure throws the several pens into writing contact with the checks or other documents, and the pens are held in this writing position by the toggle lock above described, unless by preference the controlling lever is limited in its movement, so that the toggle lock will not be effective, in which case the operator retains the pens in writing position by a continued downward pressure upon the monitor handle. When the necessary signatures or inscriptions are completed upon the two sets of checks or other documents, the pens are lifted by a slight upward movement of the monitor handle, and the writer then continues the feed motion of the chains to bring two additional sets or series of checks or documents into writing position, said subsequent series having in the meantime been placed in position upon the extension of the bed by the attendant. This operation to bring into writing position two new sets or series of documents also carries off of the bed 5 the signed or inscribed checks or documents, which are conveyed by the feeding fingers or chains through the curved throat on to the supporting strips 125 beneath the bed, in which position they are supported and permitted to become thoroughly dry while the succeeding checks or documents are being signed. This operation is continued by intermittently signing and changing the position of the checks or other documents. The signed checks or documents received by the strips or bars 125 in inverted position are fed along upon said strips or bars by the sheet engaging fingers 111, until they are deposited in the tray or drawer 140, in which they are piled up in the same order in which they were found before being passed through the machine, although with their signed faces presented downward.

The principal features of importance in the improved machine are the simplified and improved form of monitor controlling device with the toggle locking attachment and adjustable means for throwing the toggle lock out of action and for limiting the extent of elevation of the pens from the documents; and the improved means for holding the documents in writing position upon the bed or table while the writing members are operated.

The mechanism for feeding the successive documents into and out of writing position and for temporarily supporting them while the signatures dry, is not claimed in the present application.

What we claim is:

1. A device of the character described, comprising a bed, a carriage movable parallel with the bed, a plurality of writing members, means whereby the writing members are mounted upon the carriage to move toward and away from the bed, a toggle connected with the writing members and the carriage, a monitor handle, and means operatively connecting the handle with the toggle.

2. A device of the character described, comprising a bed, a carriage movable parallel with the bed, a plurality of writing members, means whereby the writing members are movably mounted upon the carriage, a toggle connected with the writing members and the carriage arranged to move the writing members toward the bed on its straightening movement and away from the bed on its breaking movement, and a monitor handle operatively connected with the toggle.

3. A device of the character described, comprising a bed, a carriage movable parallel with the bed, a plurality of writing members, means whereby the writing members are movably mounted upon the carriage, a toggle connected with the writing members and the carriage arranged to move the writing members toward the bed on its straightening movement and away from the bed on its breaking movement, means for retaining the toggle in straightened position to lock the writing members in writing position, a monitor handle, and means operatively connecting the handle with the toggle.

4. A device of the character described, comprising a bed, a carriage movable parallel with the bed, a plurality of writing members, means whereby the writing members are mounted upon the carriage to move toward and away from the bed, a toggle connected with the writing members and the carriage, a controlling lever pivotally mounted upon the carriage and connected with the toggle, and a monitor handle operatively connected with the controlling lever.

5. A device of the character described, comprising a bed, a carriage movable parallel with the bed, a plurality of writing members, means whereby the writing members are pivotally mounted upon the carriage to rock toward and away from the bed, a toggle connected with said writing members and the carriage, a controlling lever pivotally mounted upon the carriage, a link connecting the controlling lever with the toggle, and a monitor handle operatively connected with the controlling lever.

6. A device of the character described, comprising a bed, a carriage movable parallel with the bed, a plurality of writing members, means whereby the writing members are pivotally mounted upon the carriage to rock toward and away from the bed, a toggle connected with said writing members and the carriage, a controlling lever pivotally mounted upon the carriage, and connected with the toggle, means for limiting the movement of the controlling lever, and a monitor handle operatively connected with the controlling lever.

7. A device of the character described, comprising a bed, a carriage movable parallel with the bed, a plurality of writing members, means whereby the writing members are pivotally mounted upon the carriage to rock toward and away from the bed, a toggle connected with said writing members and the carriage, a controlling lever pivotally mounted upon the carriage, and connected with the toggle, adjustable means for limiting the movement of the controlling lever in both directions, and a monitor handle operatively connected with the controlling lever.

8. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a toggle connecting said rock shafts with the carriage, a monitor handle, and means operatively connecting the monitor handle with the toggle.

9. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a rock arm upon one of said rock shafts, an arm rigid upon said carriage, a toggle connecting said rock arm and said rigid arm upon the carriage, a monitor handle, and means operatively connecting the handle with said toggle.

10. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a rock arm upon one of said rock shafts, an arm rigid upon said carriage, a toggle connecting said rock arm and said rigid arm upon the carriage, a controlling lever connected with the toggle, and a monitor handle operatively engaging the controlling lever.

11. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a toggle connected with said rock shafts and the carriage, a controlling lever connected with the toggle, an adjustable screw in the path of said controlling lever to limit its movement, and a monitor handle operatively connected with said controlling lever.

12. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a toggle connected with said rock shafts and the carriage, a pivotally mounted controlling lever connected with the toggle, adjustable stops mounted in the path of the controlling lever upon opposite sides of its pivot to limit the movement of the lever in both directions, and a monitor handle operatively connected with the controlling lever.

13. A device of the character described, comprising a bed, a carriage movable parallel with the bed, a plurality of rock shafts journaled upon the carriage, means connecting the rock shafts to cause them to move in unison, a plurality of writing members mounted upon said rock shafts, a post rigidly attached to the carriage, a toggle connecting said rock shafts with said post, a forwardly projecting extension upon said post, a controlling lever pivotally mounted in said extension, a connection between said lever and said toggle, a vertically movable monitor pin mounted in said extension and operatively engaging the controlling lever, and a monitor handle mounted upon said pin.

14. A device of the character described, comprising a bed, a carriage movable parallel with the bed, a plurality of writing members, means whereby the writing members are movably mounted upon the carriage, a toggle connected with the writing members and the carriage, a forwardly extending projection upon the carriage, a controlling lever pivoted in said projection and connected with the toggle, a monitor pin movably mounted in said projection and operatively engaging said controlling lever and a monitor handle mounted upon said pin.

15. A device of the character described, comprising a bed, a carriage movable parallel with the bed, a plurality of writing members, means whereby the writing members are movably mounted upon the carriage, a forwardly projecting extension upon the carriage, a controlling lever pivotally mounted in said extension and operatively connected with the writing members, a vertically movable monitor pin mounted in said extension, means of engagement between the controlling lever and said pin, and a monitor handle upon said pin.

16. A device of the character described, comprising a bed, a carriage movable parallel with the bed, a plurality of writing members, means whereby the writing members are movably mounted upon the carriage, a forwardly projecting extension upon the carriage, a controlling lever pivotally mounted in said extension and operatively connected with the writing members, said lever having a bifurcated forward end, a vertically movable monitor pin mounted in said extension and provided with a flange or plate which engages the bifurcated end of said lever, and a monitor handle upon said pin.

17. A device of the character described comprising a bed, a carriage movable thereover, suitable controlling links connecting the carriage to the bed, a plurality of connected rock shafts journaled upon said carriage, writing members mounted upon said rock shafts, toggle links connecting said rock shafts to a part projecting from the carriage, and a monitor controlled lever connected with said toggle links.

18. The combination of a bed or table, means for conveying documents into and out of writing position upon said bed or table, a series of strips or fingers engaging the documents and holding them in writing position upon the bed or table, a plurality of writing members mounted above said bed or table and adapted to operate upon the exposed surface of documents between said strips or fingers, and means for simultaneously operating said writing member.

19. The combination of a bed or table, means for conveying documents into and out of writing position upon said bed or table, two parallel guides extending longitudinally of the bed or table, one of which is adjustable toward and away from the other, means engaging documents between said guides and holding them in writing position upon the bed or table, a plurality of writing members mounted above said bed or table and adapted to operate upon the exposed surface of documents held by said engaging means.

20. The combination of a bed or table, means for conveying documents into and out of writing position upon said bed or table, a series of strips or fingers extending longitudinally of the bed or table and adapted to engage documents adjacent to the several writing zones, means for adjusting said strips transversely of the table, a plurality of writing members mounted above said bed or table and adapted to operate upon the exposed surface of documents in the writing zones between said strips or fingers, and means for simultaneously operating said writing members.

21. The combination of a bed or table, means for conveying documents into and out of writing position upon said bed or table, parallel links adjustably mounted upon opposite sides of the bed or table, a bar connected at its opposite ends with said links and extending transversely of the bed or table, a plurality of strips or fingers mounted upon said bar and adapted to engage documents upon said bed or table, a plurality of writing members mounted above said bed or table and adapted to operate upon the exposed surface of documents between said strips or fingers, and means for simultaneously operating said writing members.

22. The combination of a bed or table, means for conveying documents into and out of writing position upon said bed or table, parallel links adjustably mounted upon opposite sides of the bed or table, a bar connected at its opposite ends with said links and extending transversely of the bed or table, a plurality of strips or fingers mounted upon said bar and adapted to engage documents upon said bed or table, said strips or fingers being independently adjustable upon said bar, a plurality of writing members mounted above said bed or table and adapted to operate upon the exposed surface of documents between said strips or fingers, and means for simultaneously operating said writing members.

WILLIAM R. WOODWARD.
FRANK E. CROMPTON.

Witnesses:
　Wm. E. Knight,
　M. G. Crawford.

Copies of this patent may be obtained for five cents each, by addressing the "Commissioner of Patents. Washington, D. C."